Sept. 27, 1960 W. R. DRESSER 2,953,964

EQUALIZING ILLUMINATION ACROSS PROJECTED IMAGE AND BETWEEN PARTS OF MOSAIC PICTURE

Filed July 21, 1954 4 Sheets-Sheet 1

INVENTOR.

W. Robert Dresser

BY Emery, Varney, Whittemore & Dix

ATTORNEYS

Sept. 27, 1960 W. R. DRESSER 2,953,964

EQUALIZING ILLUMINATION ACROSS PROJECTED IMAGE AND BETWEEN PARTS OF MOSAIC PICTURE

Filed July 21, 1954 4 Sheets-Sheet 2

INVENTOR.
W. Robert Dresser.
BY Emery, Varney, Whittemore & Dix
ATTORNEYS

INVENTOR.
W. Robert Dresser
BY Emery, Varney, Whittemore & Dix
ATTORNEYS

Sept. 27, 1960 W. R. DRESSER 2,953,964

EQUALIZING ILLUMINATION ACROSS PROJECTED IMAGE AND BETWEEN PARTS OF MOSAIC PICTURE

Filed July 21, 1954 4 Sheets-Sheet 4

INVENTOR.

W. Robert Dresser

BY Emery, Varney, Whittemore & Dix.

ATTORNEYS 2,953,964

EQUALIZING ILLUMINATION ACROSS PROJECTED IMAGE AND BETWEEN PARTS OF MOSAIC PICTURE

Willis Robert Dresser, Long Hill, Conn., assignor, by mesne assignments, to The Prudential Insurance Company of America, a corporation of New Jersey Filed July 21, 1954, Ser. No. 444,733

6 Claims. (Cl. 88—16.6)

This invention relates to the projection of mosaic images on a screen; and the invention relates more particularly to the control of the illumination of the screen so that the separate images of the mosaic picture are of the same apparent illumination intensity where they come together.

In the projection of a single motion picture from a single projector, there can be considerable variation in the illumination of the screen and it is not apparent to the audience because they have no reference with which to compare the variations. In the case of mosaic picture projection, however, when the portion of one picture is considerably brighter than the portion of the other picture which is immediately adjacent to it, the difference in illumination is immediately apparent because of the proximity of the two areas having the uneven illumination. The audience unconsciously compares them. Since the different portions of the mosaic represent different parts of the same scene, a sudden change in illumination from one part of the scene to another, where the composition of the picture obviously calls for equal illumination, produces an unpleasant effect.

It is an object of this invention to provide improved means for obtaining equal illumination on the screen over areas of a mosaic picture where the separate images come together, sometimes referred to as the "match lines" of the picture. Control means have been provided in the past whereby an attendant, located in a position where he can watch the picture, can change the illumination of the respective sections of the mosaic picture so as to maintain a reasonable degree of equality of illumination. Experience has shown, however, that in practice the attendant may not operate the controls with the required degree of accuracy, particularly in a theater where he is watching the same picture time and time again. Such attempts to obtain manual control of illumination have had the further disadvantage of making it necessary to remove some of the choice seats in the theater to make room for the illumination control attendant and the apparatus that he operates. This reduces the theater revenue while the employment of the attendant increases expenses, all without obtaining the desired effects.

It is an object of this invention to provide automatic apparatus for maintaining equal illumination on the screen at the areas where the different portions of a mosaic picture come together. In the preferred embodiments of the invention, light is controlled in such a way that substantially all of the available light is used. Instead of using shutters, or other means for reducing the amount of light from one projector, this invention utilizes a mechanism by which some of the light from the center region of the picture is transferred to the edges when it becomes necessary to increase the illumination of the edges; and conversely, when the edge portion of one picture is too bright, some of the light from that edge of the picture is transferred to the center of the picture.

All conventional projectors produce images which are brighter at their mid regions than at their edge regions, but this is not objectionable because the variation in the light from the mid regions to the edge regions is gradual and is not noticeable for a single projected area. A shifting of some of the illuminations from the mid regions of the picture to the edge regions will produce a brighter image at the edges, but the elimination of some of the light intensity from the middle of the image would not be noticed by the audience.

In accordance with one feature of the invention, means are provided to monitor the light before it passes through the film, lantern slide or other transparency that is being projected on the screen to make the mosaic image. Since it is the apparent brightness of illumination at and adjacent to the overlapping zones which should be maintained equal, the apparatus is constructed in such a way as to monitor the light which is passing through the edge portions of the transparency. The invention can be made so that the light projected through the edge portions of all of the transparencies, which will be referred to hereinafter as the "film," is maintained equal to a predetermined constant reference.

A simpler combination, and one which is, for most purposes, equally satisfactory, is obtained by using the light which passes through the edge portion of one image as the reference, and then producing a variation in the light projected through the adjacent edge portion of the other film so as to maintain the illumination of the second image equal to that of the first. Then if there is variation in the light from the first projector, as is inevitable with projectors of conventional construction, the light of the other projector will vary in the same way, at least insofar as the illumination at and adjacent to the overlapping zones is concerned, and the changes in the total illumination of the screen will not be noticeable any more than they are with a conventional projector producing only a single image on a screen.

Another feature of the invention relates to a control of the light projected through the film with independent control for the different edges of the picture. Thus the outside edge of one image of the mosaic may be maintained equal to a reference illumination intensity and the other edge of the image which is adjacent to the other image of the mosaic, may be controlled independently to maintain its illumination equal to that of the adjacent edge portion of the image produced by the other projector.

One form of the invention monitors the light from selective reflectors located immediately adjacent to the film gate, and uses this reflected light as a measure of the strength of the illumination which is received by the edge portions of the film frame at the gate. Certain modified forms of the invention use reflectors on the shutter which reflect the actual light beam directed at the film gate but during the time when the shutter is closing the optical opening through the gate. When the invention is operated in this way, the variation in light from one side of the gate to the other must be made to follow a preselected pattern, in order to obtain the desired uniformity of illumination on the screen.

Other objects, features and advantages of the invention will appear or be pointed out as the description proceeds.

In the drawing, forming a part hereof, in which like reference characters indicate corresponding parts in all the views.

Figure 1:
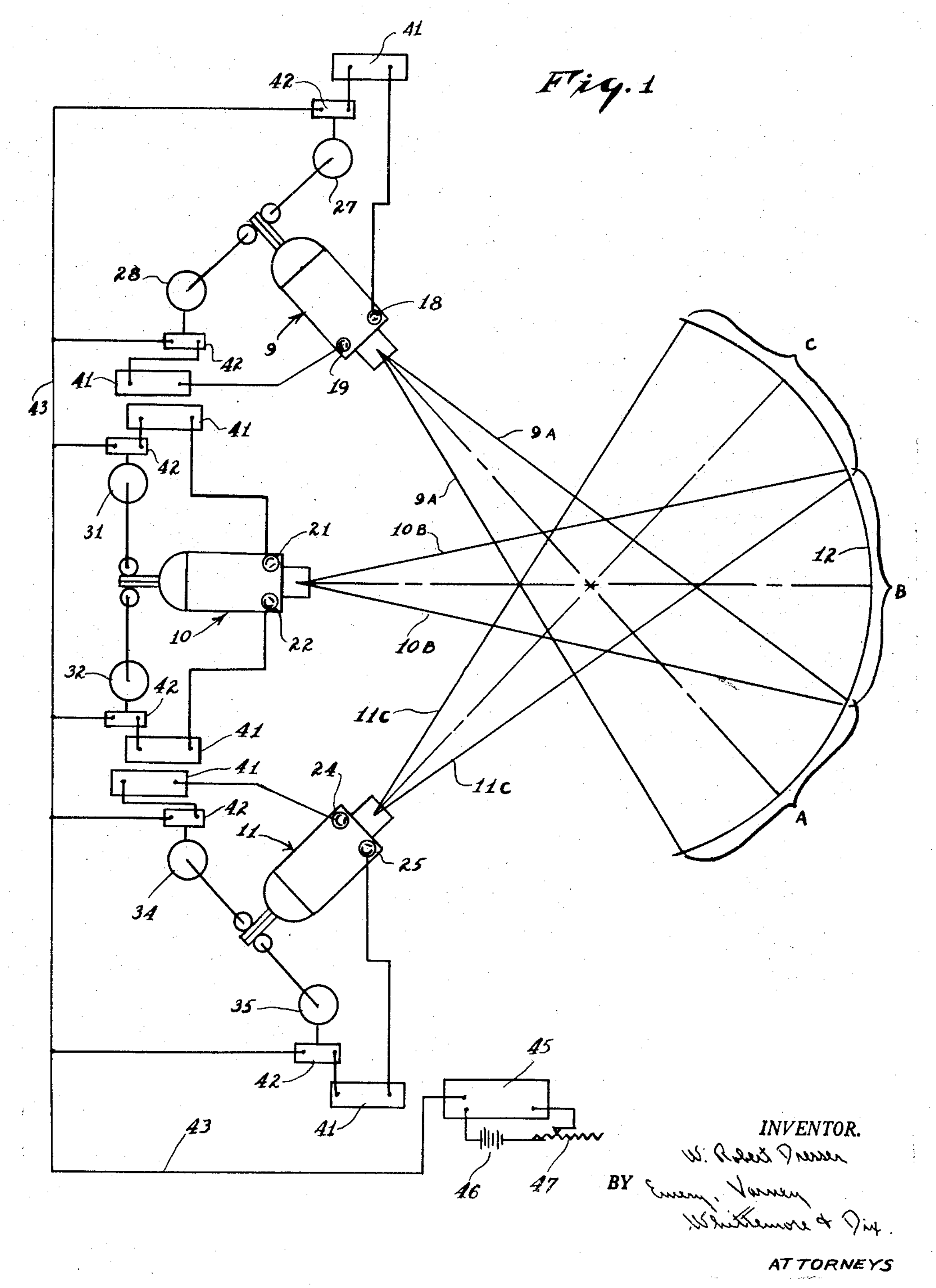
Figure 1 is a diagrammatic view illustrating the way in which the invention is applied to three motion picture projectors which are being used to project adjacent images of a mosaic picture, and with the illumination controlled in accordance with a reference standard.

Figure 1 is a top plan view showing three separate projectors 9, 10 and 11, respectively, which project images on a screen 12. The limits of the light beam projected by the projector 9 are indicated by the lines 9A; the light beam projected by the projector 10 is indicated by the lines designated by the reference characters 10B; and the beam from projector 11 by lines 11C. The light beam from the projector 9 produces an image on the screen 12 having a width indicated by the extent of the brace A. The images projected on the screen by the projectors 10 and 11 are indicated by the braces marked with the reference characters B and C.

In the earlier practice of projecting mosaic pictures, adjacent images were located so that their edge portions came together along a line. It was impossible to always maintain the exact positions of the adjacent edges of the different images and at times gaps would show between the images. The modern practice, in projecting mosaic pictures, is to have the adjacent edge portions of the images overlap one another as indicated by the overlapping of the images A and B, and B and C, on the screen 12. The camera by which the pictures are originally taken is designed to have the fields photographed by the different lenses of the camera include a common portion which is the overlap zone for the image to be projected for making the mosaic picture.

The edge portions that are to overlap are vignetted so that their transparency becomes progressively less in opposite directions; and the total illumination of the screen, by light passing through these vignetted portions of the film, is equal to that passing through the other portions of the film on either side of the overlapping vignetted zones.

The projectors 9, 10 and 11 are equipped with light control means for maintaining the illumination of the images A, B and C substantially equal at the regions of the screen where the images overlap and at the regions immediately adjacent to the overlapping zones.

The structure will be described in more detail in connection with the other figures, but the overall plan is illustrated in Figure 1 which shows monitoring cells 18 and 19, located on opposite sides of the projector 9 in position to receive light from the portions of the light beam immediately adjacent to the opposite side edges of the film gate. The projector 10 is equipped with monitoring cells 21 and 22; and the third projector 12 is similarly equipped with monitoring cells 24 and 25 located in position to receive light from the opposite side edges of the light beam immediately adjacent to the film gate.

There is a servo motor 27 which is controlled by the signal from the cell 18 and there is another servo motor 28 which is controlled by the signal from the cell 19. For the present, it is sufficient to understand that the cell 18 causes the servo motor 27 to operate in such a way as to increase the portion of the light along the left hand side of the light beam 9A when the amount of light reaching the cell 18 is below a pre-determined intensity; and conversely, the cell 18 operates the servo motor 27 so as to decrease the intensity of the illumination along the left-hand side of the light 9A when the cell 18 receives more than a pre-determined quantity of light.

In the same way the cell 19 controls the operation of the servo motor 28 to increase or decrease the intensity of the light along the right-hand side of the light beam from the projector 9. Servo motors 31 and 32 operate control mechanism in the projector 10 in response to signals from the cells 21 and 22, and other servo motors 34 and 35 operate the control mechanism in the projector 11 in response to signals from the cells 24 and 25. In the combination shown, all of the servo motors 27, 28, 31, 32, 34 and 35 are operated by comparing the signal from their control cells 18, 19, 21, 22, 24 and 25, respectively, with a standard reference signal.

Figure 1 shows a simple, single line circuit, wiring diagram by which this inter-relation of the monitoring cells and servo motors is obtained. The light responsive signal from the cell 21 passes through an amplifier 41 which has its output circuit connected to a differential relay 42. The other side of the differential relay is connected with a conductor 43 of a circuit leading from a reference signal generator 45.

This reference signal generator 45 is shown with a battery 46 and a potentiometer 47 for controlling the strength of the reference signal transmitted by the generator 45. It will be understood that the signal generator 45 may be a light responsive cell, similar to the cells 18, 19, 21, 22, 24 and 25 located in position to receive light from a source of desired intensity or to receive light which is integrated over an area.

The differential relay 42 operates the servo motor 31 in one direction or the other depending upon whether the relay 42 receives a stronger signal from the amplifier 41 or from the reference signal circuit conductor 43.

The monitoring cell 22 supplies a signal through an amplifier 41 to a differential relay 42 which controls the operation of the servo motor 32. The other side of the differential relay 42 is connected to the conductor 43 of the reference signal circuit 45. In like manner, all of the other monitoring cells supply signals through amplifiers 41 to differential relays 42 which control the operation of the other servo motors. The other sides of the differential relays are connected to the conductor 43 of the reference signal circuit.

Figure 2:
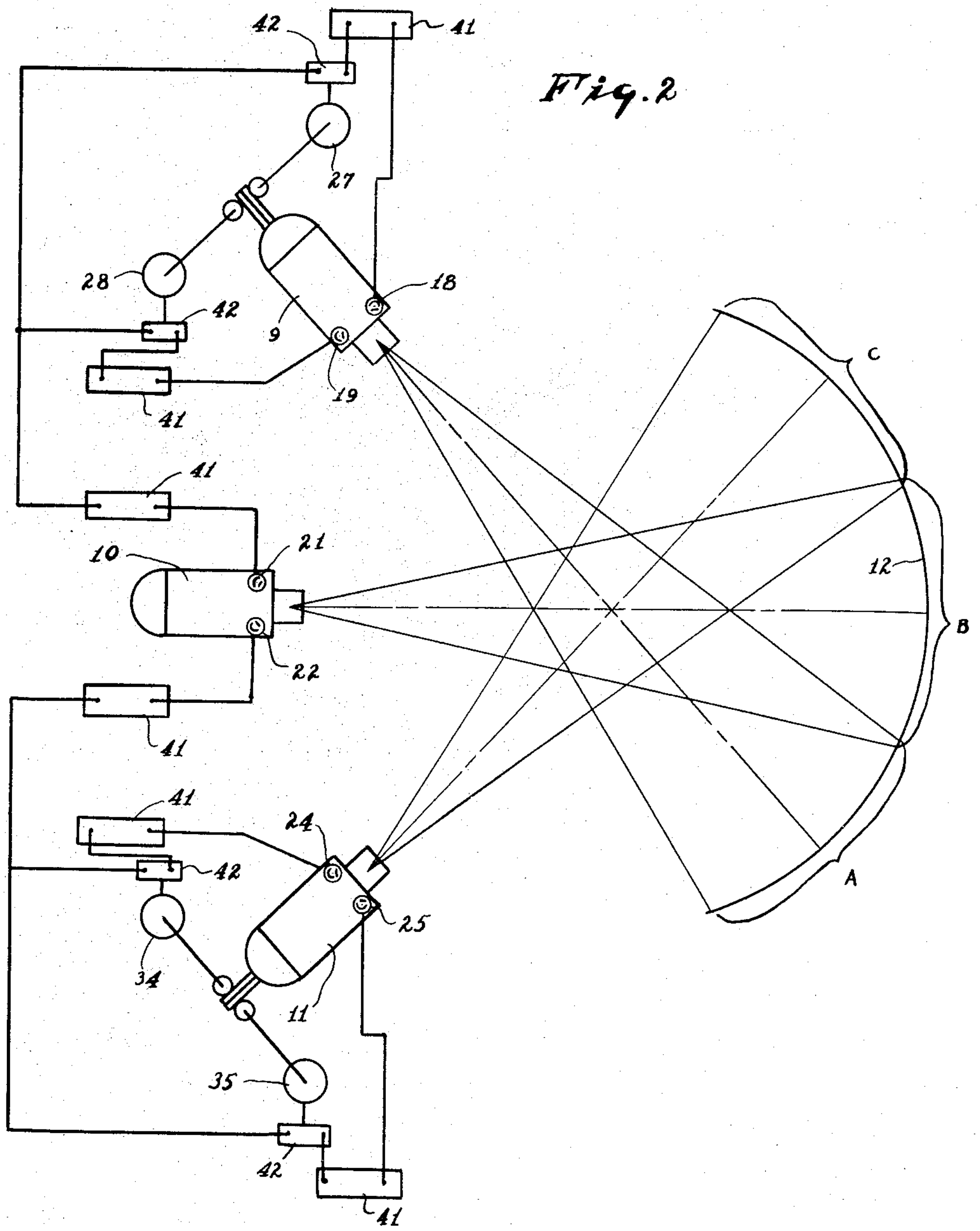
Figure 2 is a modified form of the invention in which the light variation in the side projectors is varied automatically in accordance with variations in the light from the center projector.

Figure 2 shows a wiring diagram similar to Figure 1 but with the light intensity controlled from the middle projector 10. The middle projector is allowed to operate without any control and the side projectors 9 and 11 are controlled so as to match whatever variations occur in the intensity of the light projected by the middle projector 10. Corresponding parts in Figure 2 are indicated by the same reference characters as were used in Figure 1.

Light from the middle projector 10 which forms an overlapping edge with the light beam from the projector 9 is monitored by the photo cell 21 in the middle projector 10. This photo cell 21 transmits a signal through an amplifier 41 to the differential relay 42 which controls the operation of the servo motor 28 of the projector 9.

The monitoring cell 19, in the projector 9, responds to the portion of the light beam of the projector 9 which overlaps the portion of the center light beam to which the monitoring cell 21 is responsive. If at any time the light intensity striking the photo cell 19 varies from that striking the photo cell 21, the differential relay 42 of the servo motor 28 operates the servo motor in one direction or the other as is necessary to change the light intensity in the projector 9 so that the light received by the photo cell 19 will match that received by the photo cell 21.

The differential relay which controls the operation of the servo motor 27 is connected on one side to the monitoring cell 18 and on the other side to the monitoring cell 21. The portion of the light beam to which the monitoring cell 18 is responsive, is projected on the screen at one side of the picture where it does not have to match with any other image, and so the only reasons for controlling the servo motor 27 from the monitoring cell 21 is to keep the light intensity of the image from the projector 9 equal on both sides.

The portion of the light beam from the projector 10 which overlaps the light beam from the projector 11 is monitored by a cell 22 in the projector 10. The portion of the light beam from the projector 11 which overlaps that from the projector 10 is monitored by the photo cell 24. The operation of the servo motor 34 is controlled by a differential relay 42 connected on one side with the monitoring cell 22 of projector 10 and on the other side with the monitoring cell 24 of projector 11. As in the case of the projectors 9 and 10, already described, the operation of the signals from the monitoring cells 22 and 24 at the differential relay 42 is to operate the servo motor 34 to change the light intensity from the projector 11 to match that side of the light beam of projector 10 which is monitored by the cell 22. The servo motor 35 is operated to maintain both sides of the light beam from the projector 11 equal.

Figure 3:
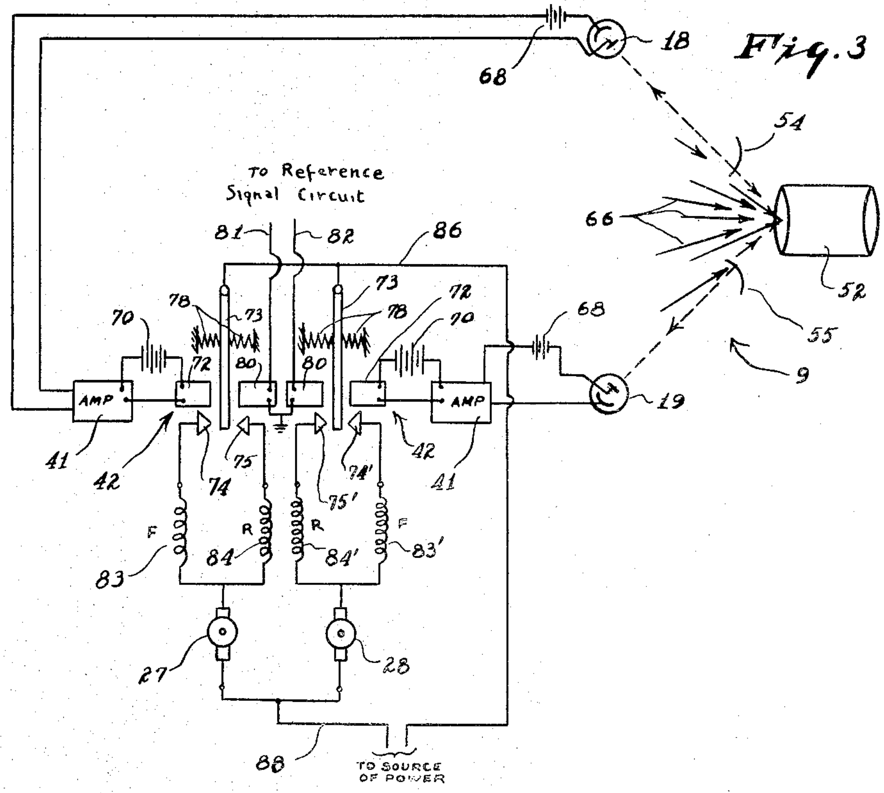
Figure 3 is a wiring diagram for one of the projectors and its control mechanism, shown in Figure 1.

Figure 3 is a wiring diagram showing the control mechanism for the servo motors 27 and 28 of the projector 9. The light beam from the arc light is indicated by the arrows 66 converging toward a lens 52. Devices comprising reflectors 54 and 55 receive light from opposite sides of the light beam and reflect it back to the photo cells 18 and 19, respectively, or to other light sensitive means, as previously explained.

Figure 3 shows the photo cells 18 and 19 supplied with power from batteries 68. The signals from the photo cells 18 and 19 are supplied to the amplifiers 41, and the outputs from these amplifiers are supplied to the relays 42. Power for the output circuits of the amplifiers 41 is supplied from batteries 70.

Each of the relays 42 includes a coil 72, an armature 73 and contacts 74 and 75. The armature 73 is normally held, in a position midway between the contacts 74 and 75 by springs 78. There is another coil 80, in each of the relays 42, opposing the coil 72. These coils 80 receive their power, through conductors 81 and 82, from the reference signal circuits; the reference signal generator in Figure 1, and the cell of the middle projector in Figure 2, or any other reference signal source that is to be used as a control. When signals in coils 72 and 80 on opposite sides of an armature 73 are equal, the springs 78 hold the armature 73 in a position midway between the contacts 74 and 75 so that it does not close the circuit to either of these contacts.

As the signal strength in either coil increases, with respect to the other, the attraction of that coil for the armature 73 becomes greater and finally overcomes the pressure of the opposing spring 78 so that the armature 73 is pulled into a position where it touches the contact 74 or 75.

The servo motor 27 has field windings 83 and 84. When the field winding 83 is energized, the motor runs in a forward direction; and when the field winding 84 is energized, the motor runs in a reverse direction. The armature 73 is connected with a power line by a conductor 86. When the armature 73 is against the contact 74, power from the conductor 86 flows through the armature 73, contact 74, and through the coil 83 of the servo motor 27. The motor is connected to the other side of the power line by a conductor 88. When the armature 73 is against the contact 75, the circuit is shifted to the field winding 84 so that the direction of rotation of the motor 27 is reversed. The circuit for controlling the operation of the servo motor 28 is similar to that already described, and corresponding parts are indicated by the same reference characters as for the servo motor 27. The apparatus shown in Figure 2 is strictly diagrammatic and the circuits are laid out to simplify the combination in order to make the invention more easily understood.

Figure 4:
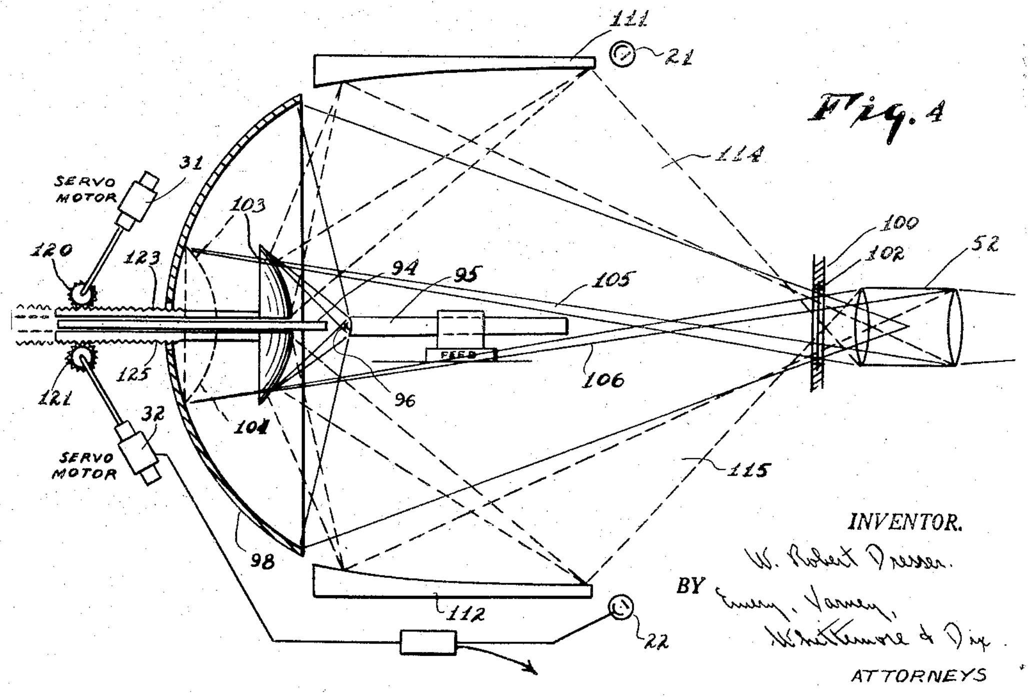
Figure 4 is a diagrammatic view illustrating the way in which the intensity of the illuminations is shifted between the center and the sides of the light beam in order to control the illumination of the edges of the image.

Figure 4 is a diagrammatic view of form of light control apparatus for use in any one of the projectors shown in Figures 1 and 2. The source of light for the projector, consists of a carbon arc light having two electrodes 95 and 95. Mechanisms for feeding and properly spacing the electrodes to control the arc is not illustrated since it is conventional and well-known, and no illustration of it is necessary for a complete understanding of this invention. The arc itself is indicated by the reference character 96.

There is a reflector 98 behind the arc 96 for reflecting a converging beam of light to a film gate 100 of the projector. A film 101 passes through the gate 100. In order to make it possible to control the amount of light on different sides of the light beam, there are auxiliary light reflectors. An auxiliary reflector 103 is located on the left hand side of the projector, and this reflector 103 is a portion of the surface of a spheroid. A similar auxiliary reflector 104 is located on the right hand side of the projector. When both of these auxiliary reflectors 103 and 104 are located in their rearward positions, indicated by dotted lines in Figure 4, they reflect a portion of the light beam, which would otherwise be reflected from the main reflector 98 along the lines indicated by the beam margin lines 105 and 106.

The auxiliary reflectors 103 and 104 are movable axially to the positions illustrated by full lines in Figure 4. In these full line positions, the auxiliary reflectors 103 and 104 reflect light from the arc 96 to side auxiliary reflectors 111 and 112, each of which is substantially half of a zone of an inside parabolic surface. From these side reflectors 111 and 112, the light is reflected along converging beams 114 and 115, respectively, to the film gate 100.

In moving from the dotted to the full line positions, the auxiliary reflectors 103 and 104 block off progressively more of the main reflector 98 so that there is less light in the converging beam from the reflector 98, and more light diverted to the sides of the film gate 100 by reflection from the auxiliary reflectors 103 and 104 and the side reflectors 111 and 112.

The auxiliary reflector 103 is moved between its dotted line and full line positions by the servo motor 31 which drives a pinion 120 meshing with a rack 121 on the face of a slide 123 by which the auxiliary reflector 103 is carried. The auxiliary reflector 104 is similarly operated by the servo motor 32 through rack and pinion mechanism which moves a slide 125 by which the auxiliary reflector 104 is carried.

Figures 5, 6, 7, 8:
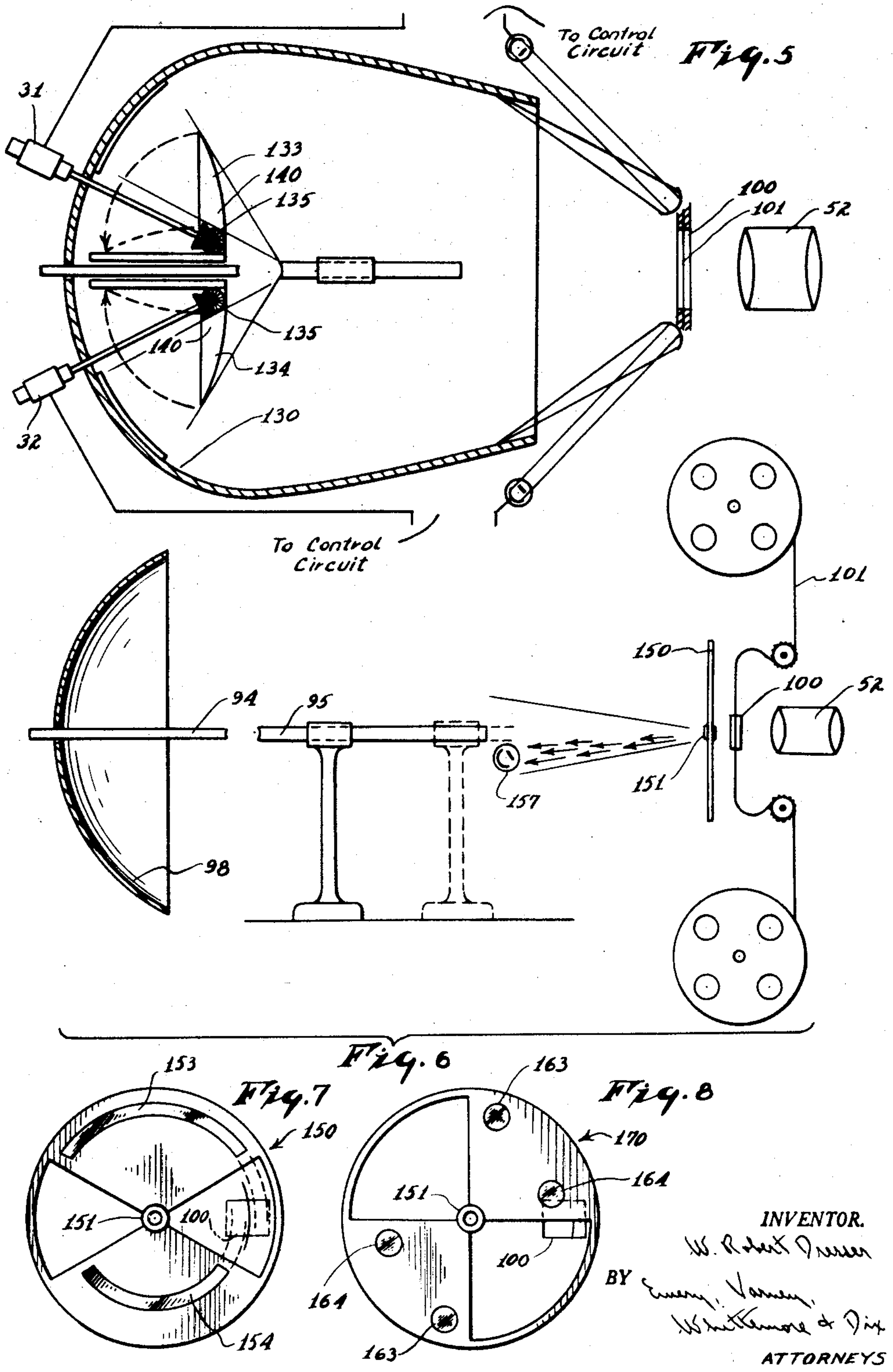
Figure 5 is a view similar to Figure 4 but showing a modified form of the invention.
Figure 6 is a diagrammatic elevation showing a third modified form of the invention.
Figure 7 is a rear view of the shutter used in the combination shown in Figure 6.
Figure 8 is a view similar to Figure 7 but showing a different arrangement of reflectors on the shutter.

Figure 5 shows a modified construction in which a main stationary reflector 130, of generally elliptical shape, is of much greater extent than the main reflector in Figure 4, and there are auxiliary reflectors 133 and 134 supported on vertical shafts 135 which turn to change the angles of the auxiliary reflectors 133 and 134 between the dotted line and full line positions shown in Figure 5.

When in the dotted line positions, the auxiliary reflectors 133 and 134 have no effect upon the light beams since they are folded back into a position where they do not reflect any light and do not interfere with the operation of the main reflector 130. When the auxiliary reflectors 133 and 134 are flung outwardly and forwardly to the limits of their angular movement, in which positions they are shown in full lines in Figure 5, they block the light to a large portion of the main reflector 130 and direct this intercepted light against the side portions of the main reflector 130 so that the light passes to the sides of the film gate 100 instead of to the center of the film gate. Thus by swinging the auxiliary reflectors 133 and 134 into different angular positions, it is possible to subtract light from the center of the light beam and add it to the sides of the light beam.

The auxiliary reflectors 133 and 134 are operable independently of one another so that the light can be added to one side or the other of the light beam, depending upon where it is needed, without changing the other side. The auxiliary reflector 133 is operated by the servo motor 31 through a motion transmitting connection which includes a shaft 139 and gearing 140. The auxiliary reflector 134 is operated by similar motion transmitting connections from the servo motor 32.

Figure 6 shows another modification of the invention in which the monitoring of the light beam is done by reflecting light from the back of a shutter of the motion picture projector instead of intercepting the light adjacent to the edges of the light beam and just outside of the open area of the film gate, as in Figures 4 and 5. The advantage of reflecting light from the back of the shutter is that this makes it possible to measure the actual intensity of the light which is directly behind the film gate whereas the edge reflectors in Figures 4 and 5 rely upon the similarity of intensity variations between the light which is actually passing through the side portions of the film and the light immediately adjacent to the edges of the gate but actually outside of the open area of the gate.

A shutter 150 rotates about an axially extending shaft 151. The rearward face of this shutter 150 is shown in Figure 7, and there are mirrors, or reflecting rings, 153 and 154 attached to the flicker blades of the shutter 150. The ring 153 is in a position to reflect light from behind the right hand side of the film gate 100, and the ring 154 is in position to reflect light from the left hand side of the film gate. Photo cells 157 (Fig. 6) can be located in any convenient position to receive the light reflected from the rings 153 and 154. There are two photo cells 157, one for each of the rings 153 and 154. One of the cells 157 is behind the other in Figure 6. One cell may be used if the rings 153 and 154 are oriented to reflect light alternately to a single cell which has its circuit switched to different reference circuits.

If the apparatus in Figures 6 and 7 is to be used for monitoring the light by measuring the intensity at the center of the beam and without regard to any variations between one side or the other of the light beam, then the reflecting rings 153 and 154 are concentric and located on the flicker blades in position to pass across the center of the film gate 100 as the shutter 150 rotates on its axle 151. When the reflector rings 153 and 154 monitor the light on opposite sides of the film gate 100, then the two photo cells which receive reflected light from the respective rings are used to operate auxiliary reflectors such as shown in Figures 3 and 4. If the reflecting rings 153 and 154 merely monitor the light at the center of the beam, and only one photo cell 157, is used, then the signal from this photo cell can be used for operating any conventional control mechanisms for varying the total light from a carbon arc light, or whatever other kind of light is used in the projector.

Figure 8 shows another modified form of the invention, in which there are reflector discs 163 and 164 attached to the rearward faces of the flicker blades of a shutter 170. There are four such reflectors shown in Figure 8.

These reflectors can be located so that the two reflectors 163 pass across the portion of the film gate 100 through which the right hand portion of the light beam passes, and the other reflectors 164 can be located in position to pass across the left hand portion of the film gate 100. In this way they will take the place of the reflector rings 153 and 154 of Figure 7, except that the angularly spaced reflectors 163, approximately 180° apart, produce two separate signals for the photo cell instead of the one longer signal produced by a reflector ring shown in Figure 7. If desired, both of the reflectors 153 can be located on the same flicker blade of the shutters so that their spacing from one another is somewhat less than 90°. This location, and the number of reflectors to be used, depends upon the particular control circuits and whether they are designed for operation with a signal of substantial duration or a plurality of short pulse signals.

As in the case of Figure 7, the construction shown in Figure 8 can be used for monitoring only the center of the light beam, and when so used, the reflectors 163 and 164 are all located at the same radial distance from the center of rotation of the shutter shaft 151 and in position to pass across the center portion of the film gate 100.

The preferred embodiment of this invention and some modifications have been illustrated and described, but various changes can be made and some features can be used in different combinations without departing from the invention as defined in the claims.

What is claimed is:

1. Apparatus for projecting a mosaic picture which includes at least two images that have edge portions adjacent to one another at a match region on a screen, said apparatus including a first projector for projecting one of the images, and a second projector for projecting the other of the images, a separate light beam source for each projector, each projector having two reflectors associated with the light beam source and each of which is on a different side of the light beam source and in position to supply a portion of the light to an edge region of the image and to a different edge region from that of the other reflector, one reflector of the second projector being movable to change the intensity of the light at the match region of the image, each of the projectors including also a gate at which a transparency is held in the path of the light beam and in position to have its image projected as one of the images of the mosaic picture, and automatic means for varying the intensity of at least an edge portion of the light beam from the second projector to maintain the intensity of the light beams substantially equal at the match region, said automatic means including light-responsive means in the first projector in position to monitor the intensity of the light beam adjacent to the side of the light beam that projects the match region edge portion of the image from the first projector, other light-responsive means in the second projector in position to monitor the intensity of the light beam adjacent to the side of the light beam that projects the match region edge portion of the image from the second projector, a motor connected with the movable reflector of the second projector, and a motor controller connected with the motor and having circuits connected with the light-responsive means of both of the projectors.

2. The apparatus described in claim 1 and in which the projectors are motion picture projectors and the transparencies are picture frames of film strips which are advanced through the projectors whereby transparencies of different intensities are brought to the film gates of the projectors, and in which the light-responsive means of each projector comprises apparatus having a part thereof located in the light beam between the light beam source and the gate of the projector.

3. The apparatus described in claim 2 and in which said part of the light responsive apparatus has a reflector surface in the path of that part of the light beam just outside of the portion of the beam that passes through the gate to project the match region of the image on the screen, and the light-responsive means includes a photo cell in the path of the light reflected by said reflector surface.

4. The apparatus described in claim 2 and in which each projector includes a shutter between the light beam source and the gate, and said shutter is movable periodically into position in which it shuts off the supply of light to the gate and the transparency, and in which said part of the light responsive apparatus has a reflector surface located on the rearward face of the shutter.

5. The apparatus described in claim 1 and in which there are automatic means for varying the intensity of at least the edge portion of the light beams of the first as well as the second projector, and there is a different motor connected with the reflectors of each of the first and second projectors, and in which there are a motor controller for each motor and a source of constant reference voltage, and the motor controller for each projector is connected with the light-responsive means of that projector and also with the source of constant reference voltage.

6. The apparaus described in claim 1 and in which there is a third projector that projects an image having a match region on the side of the image of the second projector opposite to the match region of the images of the first and second projectors, and the projectors have automatic means correlated to maintain the intensity of the match region illumination at the match region of the first and second projectors independently of the maintenance of the intensity of illumination at the match region of the second and third projectors.

References Cited in the file of this patent

UNITED STATES PATENTS

| | | |
|---|---|---|
| 947,490 | Gwozdz | Jan. 25, 1910 |
| 1,205,224 | Koechlein | Nov. 21, 1916 |
| 1,248,456 | Clark | Dec. 4, 1917 |
| 1,424,525 | Seely | Aug. 1, 1922 |
| 1,731,104 | Mayer | Oct. 8, 1929 |
| 2,517,246 | Seitz et al. | Aug. 1, 1950 |
| 2,563,892 | Waller et al. | Aug. 14, 1951 |
| 2,610,544 | Waller et al. | Sept. 16, 1952 |
| 2,816,477 | Waller | Dec. 17, 1957 |